US012751416B2

(12) United States Patent
Frankowski et al.

(10) Patent No.: US 12,751,416 B2
(45) Date of Patent: Oct. 6, 2026

(54) MILK-FLOW CONTROL UNIT, COMPUTER-IMPLEMENTED METHOD FOR CONTROLLING A FLOW OF MILK, COMPUTER PROGRAM AND NON-VOLATILE DATA CARRIER

(71) Applicant: DELAVAL HOLDING AB, Tumba (SE)

(72) Inventors: Janusz Frankowski, Tumba (SE); Maciej Kosowski, Tumba (SE)

(73) Assignee: DeLaval Holding AB, Tumba (SE)

( * ) Notice: Subject to any disclaimer, the term of this patent is extended or adjusted under 35 U.S.C. 154(b) by 551 days.

(21) Appl. No.: 18/258,510

(22) PCT Filed: Dec. 16, 2021

(86) PCT No.: PCT/SE2021/051271
§ 371 (c)(1),
(2) Date: Jun. 20, 2023

(87) PCT Pub. No.: WO2022/139661
PCT Pub. Date: Jun. 30, 2022

(65) Prior Publication Data

US 2024/0032499 A1 Feb. 1, 2024

(30) Foreign Application Priority Data

Dec. 21, 2020 (SE) .................................... 2051519-3

(51) Int. Cl.
*A01J 9/04* (2006.01)

(52) U.S. Cl.
CPC ....................................... *A01J 9/04* (2013.01)

(58) Field of Classification Search
None
See application file for complete search history.

(56) References Cited

U.S. PATENT DOCUMENTS

| | | | | |
|---|---|---|---|---|
| 3,448,589 A * | 6/1969 | Marshall | A01J 9/04 | 62/392 |
| 3,713,218 A * | 1/1973 | Laike | A01J 9/04 | 119/14.09 |

(Continued)

FOREIGN PATENT DOCUMENTS

| | | | |
|---|---|---|---|
| EP | 1251732 | A1 | 10/2002 |
| RU | 2613454 | C1 | 3/2017 |

(Continued)

OTHER PUBLICATIONS

International Search Report for PCT/SE2021/051271 mailed Feb. 28, 2022, 2 pages.

(Continued)

*Primary Examiner* — Thor S Campbell
(74) *Attorney, Agent, or Firm* — NIXON & VANDERHYE

(57) ABSTRACT

A control unit, computer-implemented method, and computer program for controlling a milk transport and cooling apparatus where a flow of milk is controlled from a balance tank to a storage tank, based on a temperature-indicating signal measuring a temperature of the flow of milk before entering the storage tank, and a level-indicating signal reflecting a milk level in the balance tank in relation to low- and high-threshold levels respectively, such that the control unit generates a first control signal controlling the speed of the milk pump based on the temperature-indicating signal when the level-indicating signal is within low- and high-threshold levels respectively, and can also generate a second control signal controlling a capacity of a chiller based on the temperature-indicating signal with respect to an uninterrupted time period.

17 Claims, 2 Drawing Sheets

(56) References Cited

U.S. PATENT DOCUMENTS

| | | | | | |
|---|---|---|---|---|---|
| 4,013,043 | A * | 3/1977 | Kirwan | A01J 7/00 | 119/14.09 |
| 4,932,222 | A * | 6/1990 | Adams, Jr. | F25D 17/02 | 165/104.31 |
| 5,080,040 | A * | 1/1992 | van der Lely | A01J 5/08 | 119/14.09 |
| 5,272,997 | A * | 12/1993 | van der Lely | A61D 17/002 | 119/14.08 |
| 5,275,124 | A * | 1/1994 | van der Lely | A01J 7/022 | 119/14.08 |
| 5,701,756 | A * | 12/1997 | Ghiraldi | A01J 9/04 | 62/438 |
| 5,957,081 | A * | 9/1999 | van der Lely | A01J 9/00 | 119/14.09 |
| 6,131,398 | A * | 10/2000 | Versteijnen | F25B 5/02 | 62/99 |
| 6,769,261 | B2 * | 8/2004 | Gustavsson | A01J 9/04 | 366/144 |
| 6,782,705 | B2 * | 8/2004 | Lidman | F25D 31/002 | 119/14.01 |
| 6,857,278 | B2 * | 2/2005 | Gruber | A01J 9/04 | 62/99 |
| 7,356,997 | B2 * | 4/2008 | Gruber | A01J 9/04 | 62/157 |
| 9,535,008 | B2 * | 1/2017 | Van Halsema | H04N 7/183 | |
| 11,229,186 | B2 * | 1/2022 | Stopa | F25D 31/002 | |
| 2003/0230243 | A1 * | 12/2003 | Van Der Lely | A01K 1/12 | 119/14.08 |
| 2004/0129227 | A1 * | 7/2004 | Lidman | A01J 9/04 | 119/14.09 |
| 2007/0272158 | A1 * | 11/2007 | Kaever | A01J 9/04 | 119/14.08 |
| 2011/0256288 | A1 * | 10/2011 | Isenberg | A23B 2/001 | 426/520 |
| 2013/0269367 | A1 * | 10/2013 | Meillan | A23B 11/14 | 62/3.1 |
| 2017/0099801 | A1 * | 4/2017 | Van Tilburg | A01J 9/00 | |
| 2017/0142937 | A1 * | 5/2017 | De Groot | A01K 1/12 | |
| 2017/0150695 | A1 * | 6/2017 | Meillan | A01J 5/01 | |
| 2017/0231188 | A1 * | 8/2017 | Stopa | F28D 15/00 | 119/14.09 |
| 2020/0008389 | A1 * | 1/2020 | Stopa | A23B 11/14 | |
| 2024/0003606 | A1 * | 1/2024 | Kosowski | A01J 9/04 | |
| 2024/0215528 | A1 * | 7/2024 | Bosek | A01J 9/04 | |

FOREIGN PATENT DOCUMENTS

| | | | |
|---|---|---|---|
| RU | 2655732 | C1 | 5/2018 |
| RU | 2698262 | C1 | 8/2019 |
| WO | 9716962 | A1 | 5/1997 |
| WO | 0156370 | A1 | 8/2001 |
| WO | 02074069 | A1 | 9/2002 |
| WO | 2020046139 | A1 | 3/2020 |

OTHER PUBLICATIONS

Written Opinion of the ISA for PCT/SE2021/051271 mailed Feb. 28, 2022, 7 pages.

Search Report for SE Application No. 2051519-3 mailed Jul. 23, 2021, 3 pages.

* cited by examiner

MILK-FLOW CONTROL UNIT, COMPUTER-IMPLEMENTED METHOD FOR CONTROLLING A FLOW OF MILK, COMPUTER PROGRAM AND NON-VOLATILE DATA CARRIER

CROSS-REFERENCE TO RELATED APPLICATIONS

This application is the U.S. national phase of International Application No. PCT/SE2021/051271 filed Dec. 16, 2021 which designated the U.S. and claims priority to SE Patent Application No. 2051519-3 filed Dec. 21, 2020, the entire contents of each of which are hereby incorporated by reference.

TECHNICAL FIELD

The present invention relates generally to milk-flow and cooling regulation. Especially, the invention relates to a control unit arranged to control a flow of milk through a cooling system between a balance tank and a storage tank and a corresponding computer-implemented method. The invention also relates to a computer program and a non-volatile data carrier storing such a computer program.

BACKGROUND

For quality and hygienic reasons it is important that the temperature of the milk that is extracted from milk-producing animals is kept sufficiently low throughout the storage process. The rate at which an incoming milk flow enters the system is typically unstable, at least to some extent, due to the fact that different animals produce different amounts of milk per unit time. The number of animals from which milk is extracted may also vary during a milking sequence. It is therefore challenging to control the cooling of the milk between an input balance tank and a storage tank, where the milk is held until being transported to a dairy, or similar facility.

WO 97/16962 shows an apparatus for cooling a product, which apparatus comprises a heat exchanger structure including a first evaporator and a second evaporator separate from the first evaporator, wherein a first heat exchanger incorporates the first evaporator and a second heat exchanger incorporates the second evaporator. In operation, the product or an intermediate heat transfer medium is cooled in at least two first stages. During the first stage, heat is withdrawn from the product or the medium by the first evaporator cooling the product or the medium to an intermediate temperature. During the second stage, heat is withdrawn from the product or the medium by the second evaporator further cooling the product or the medium to the desired temperature. Since the product or the medium is partially cooled by an evaporator operating at a higher evaporating temperature than required for achieving the desired temperature, an improved energy efficiency is achieved. WO 97/16962 further discloses a control unit for controlling the temperature of the milk by controlling a pump, so that the flow rate through the heat exchanger structure is increased if a temperature of the milk downstream of the heat exchanger is too low and vice versa the flow rate is decreased if the temperature is too high.

Thus, there is an apparatus enabling adaptive pumping and cooling of a product, such as extracted milk, which apparatus may be applied to cool the product while transporting it from the balance tank to the storage tank. However, the known solution leaves room for further economizing of the energy resources used for pumping and cooling the extracted milk.

SUMMARY

The object of the present invention is therefore to offer a solution that solves the above problem and enables more efficient pumping and cooling of extracted milk before storing the milk in a storage tank.

According to one aspect of the invention, the object is achieved by a control unit arranged to control a flow of milk through a cooling system between a balance tank and a storage tank. The balance tank is here presumed to receive an input in the form of milk extracted from a number of milking animals. The control unit is configured to generate a first control signal to a milk pump in the cooling system, which milk pump is arranged to cause the flow of milk to be pumped out from the balance tank. The balance tank contains at least one sensor configured to produce a level-indicating signal reflecting a milk level in the balance tank in relation to low- and high-threshold levels respectively. The control unit is configured to receive the level-indicating signal and a temperature-indicating signal from a temperature sensor measuring a temperature of the flow of milk before entering the storage tank. The control unit is configured to generate the first control signal based on the level-indicating signal and the temperature-indicating signal so that a speed of the milk pump is controlled by the first control signal being based on the temperature-indicating signal exclusively if the level-indicating signal reflects that the milk level in the balance tank is between the low-threshold level and the high-threshold level.

In this way, when the milk level is within said range, the milk flow (pump speed) is efficiently controlled by the temperature sensor to achieve a desired/stable temperature on the milk flowing from the cooling system and into the storage tank. The control unit is hereby made independent on milk flow sensors or meters, which are generally more complicated/expensive and unhygienic in relation to temperature sensors. Furthermore, the milk level sensor could be configured as two floats located at the low- and high-threshold levels in the balance tank, but it could alternatively be any other type of milk-level sensor (such as a hydrostatic pressure sensor) capable of also producing a continuous/linear level-indicating signal of the different milk levels between the low- and high-threshold levels. The above control unit is advantageous in that it enables a different type of control of the milk pump (as well as the cooling system) at more extreme milk levels in the balance tank. Hence, the above control unit is advantageous because it can for instance avoid unnecessary operation of the milk pump (and cooling system) when the milk level is below the low-threshold level, whereas the milk pump may run at a predetermined high (maximum) speed when the milk level is above the high-threshold level. In other words, the milk temperature is no longer controlling the pump speed when the milk level is below and above the low- and high-threshold levels respectively, so that more important (overriding) parameters such as energy saving and safeguarding a receiving capacity of the balance tank is enabled by the control unit. It should hereby be emphasized that the milk temperature can nevertheless be kept within an acceptable desired range in a high (maximum) pump speed operation at a high-threshold level by temporarily increasing the cooling effect on the cooling system.

According to one embodiment of this aspect of the invention, the control unit is configured to generate the first control signal such that the milk pump causes the flow of milk to be pumped out from the balance tank at a predetermined high speed if the level-indicating signal reflects that the milk level in the balance tank is above or equal to the high-threshold level. This is desirable because it minimizes the risk that the balance tank is flooded, which, in turn, is deemed to be more critical than the milk temporarily attaining an excessive temperature due to insufficient cooling in the cooling system. Preferably, therefore, the predetermined high speed represents a highest possible pump speed for the milk pump.

According to another embodiment of this aspect of the invention, the control unit is configured to generate a second control signal based on the temperature-indicating signal such that a cooling capacity of the cooling system is increased if the temperature indicating signal reflects a milk temperature above a set temperature. Thus, the milk pump will be operated at a predetermined high speed also when the milk temperature is high, and the temperature-indicating signal may be used to increase a capacity of a chiller and/or a coolant pump speed.

Analogously, according to another embodiment of this aspect of the invention, the control unit is configured to generate the second control signal based on the temperature-indicating signal such that the cooling capacity of the cooling system is decreased if the temperature-indicating signal reflects a milk temperature below the set temperature. Thus, the milk pump will be operated at the predetermined high speed when the milk temperature is low, and the temperature-indicating signal is used to decrease a cooling capacity of the cooling system by decreasing the cooling capacity of the chiller and/or the speed of the coolant pump to further economize the energy usage.

According to still another embodiment of this aspect of the invention, the control unit is configured to generate the first control signal such that the milk pump causes the flow of milk to be pumped out from the balance tank at a predetermined low speed if the level-indicating signal reflects that the milk level in the balance tank is below or equal to the low-threshold level. This saves energy and reduces the risk of emptying the balance tank. Preferably, the predetermined low speed represents that the milk pump is inactive. Furthermore, the coolant system including a chiller and a coolant pump is preferably placed in an idle mode or turned off, whenever the milk pump is inactive. In this way the embodiment saves further energy.

According to yet another embodiment of this aspect of the invention, the control unit is configured to generate the first control signal based on the temperature-indicating signal so that the milk flow is caused to be pumped out from the balance tank at a predetermined nominal speed if the temperature-indicating signal indicates a milk temperature within a predefined interval from a set temperature. If, however, the temperature-indicating signal indicates a milk temperature below said predefined interval, the control unit is configured to generate the first control signal so that the milk flow is caused to be pumped out from the balance tank at an elevated speed above the predetermined nominal speed; and if the temperature-indicating signal indicates a milk temperature above said predefined interval, the control unit is configured to generate the first control signal so that the milk flow is caused to be pumped out from the balance tank at a lowered speed below the predetermined nominal speed. Namely, this allows a high milk throughput while keeping the milk temperature within an acceptable range and economizing the energy usage.

According to still another embodiment of this aspect of the invention, the cooling system contains a heat exchanger configured to transfer heat energy from the flow of milk to a cooling medium being circulated in a chiller by means of a coolant pump operating in response to a second control signal. Here, the control unit is configured generate the second control signal based on the temperature-indicating signal so that a flow of the cooling medium and/or the cooling capacity of the chiller increases if the temperature-indicating signal indicates a milk temperature above said predefined interval during a first uninterrupted period.

Analogously, the control unit is configured generate the second control signal based on the temperature-indicating signal so that the flow of the cooling medium and/or the cooling capacity of the chiller decreases if the temperature-indicating signal indicates a milk temperature below said predefined interval during a second uninterrupted period. Thereby, the chiller may also attain an efficient energy usage.

According to another aspect of the invention, the object is achieved by a computer-implemented method for controlling a flow of milk through a cooling system between a balance tank and a storage tank, where the balance tank receives an input in the form of milk extracted from a number of milking animals, and the method involves receiving a temperature-indicating signal from a temperature sensor measuring a temperature of the flow of milk before entering to the storage tank. The method also involves generating a first control signal to a milk pump in the cooling system, which milk pump is arranged to cause the flow of milk to be pumped out from the balance tank, and which first control signal is generated based on the temperature-indicating signal. It is presumed that the balance tank contains at least one sensor configured to produce a level-indicating signal reflecting a milk level in the balance tank in relation to low- and high-threshold levels respectively. Additionally, the method further involves receiving the level-indicating signal, and generating the first control signal on the further basis of the level-indicating signal. Here, a speed of the milk pump is controlled by the first control signal being based on the temperature-indicating signal exclusively if the level-indicating signal reflects that the milk level in the balance tank is between the low-threshold level and the high-threshold level. The advantages of this method, as well as the preferred embodiments thereof, are apparent from the discussion above with reference to the proposed control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
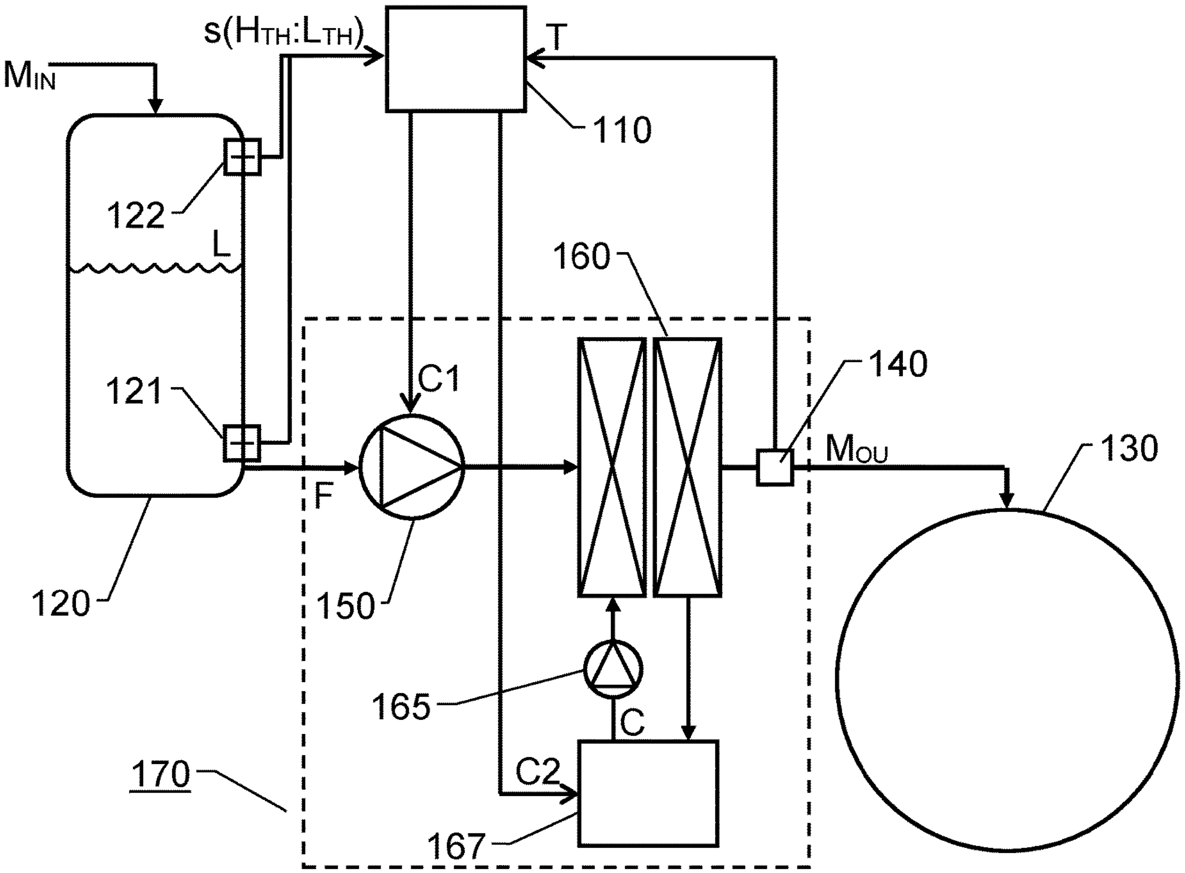
FIG. 1 schematically illustrates a milk handling system including a control unit according to one embodiment of the invention.

In FIG. 1, we see a schematic illustration of a milk handling system that includes a control unit 110 according to one embodiment of the invention.

The control unit 110 is arranged to control a flow of milk F through a cooling system 170 between a balance tank 120 and a storage tank 130. The storage tank 130 is adapted to accumulate milk that has been collected during a relatively long period, namely between consecutive pickups of the milk for further transport to a dairy or similar facility, which pickups typically occur every 24 or 48 hours. Consequently, the storage tank 130 has a comparatively large capacity. The balance tank 120, on the other hand, has a comparatively low capacity because here the milk is just buffered briefly before being forwarded through the cooling system 170. The balance tank 120 is adapted to receive an input $M_{IN}$ in the form of milk having been extracted from a number of milking animals. Thus, one or more milking points may feed milk to the balance tank 120 directly or for example via a so-called end unit, or receiver.

A temperature sensor 140 is arranged on a milk conduit feeding the milk into the storage tank 130. The temperature sensor 140 is configured to measure a temperature of the flow of milk F before entering the storage tank 130. The balance tank 120 contains at least one sensor, here represented by a first sensor 121 and a second sensor 122, which are configured to produce a level-indicating signal $s(L_{TH}:H_{TH})$ reflecting a milk level L in the balance tank 120 in relation to a low-threshold level $L_{TH}$ and a high-threshold level $H_{TH}$ respectively. For example, the low-threshold level $L_{TH}$ may represent 10% of a storage capacity of the balance tank 120 and the high-threshold level $H_{TH}$ may represent 90% of the storage capacity of the balance tank 120.

The control unit 110 is configured to receive the temperature-indicating signal T from the temperature sensor 140. The control unit 110 is also configured to receive the level-indicating signal $s(L_{TH}:H_{TH})$ from the at least one sensor 121/122. Based on the temperature-indicating signal T and the level-indicating signal $s(L_{TH}:H_{TH})$, the control unit 110 is configured to generate a first control signal C1 to a milk pump 150 in the cooling system 170, which milk pump 150 is arranged to cause the flow of milk F to be pumped out from the balance tank 120 and through the cooling system 170. Specifically, the first control signal C1 is generated based on the temperature-indicating signal T and the level-indicating signal $s(L_{TH}:H_{TH})$ in such a manner that a speed of the milk pump 150 is controlled by the first control signal C1 based on the temperature-indicating signal T exclusively if the level-indicating signal $s(L_{TH}:H_{TH})$ reflects that the milk level L in the balance tank 120 is between the low-threshold level $L_{TH}$ and the high-threshold level $H_{TH}$. Otherwise, i.e. when the milk level L does not lie within the range given by the low- and high-threshold levels $L_{TH}$ and $H_{TH}$, the first control signal C1 is not based on the temperature-indicating signal T as will be explained below, inter alia with reference to FIG. 2.

Figure 2:
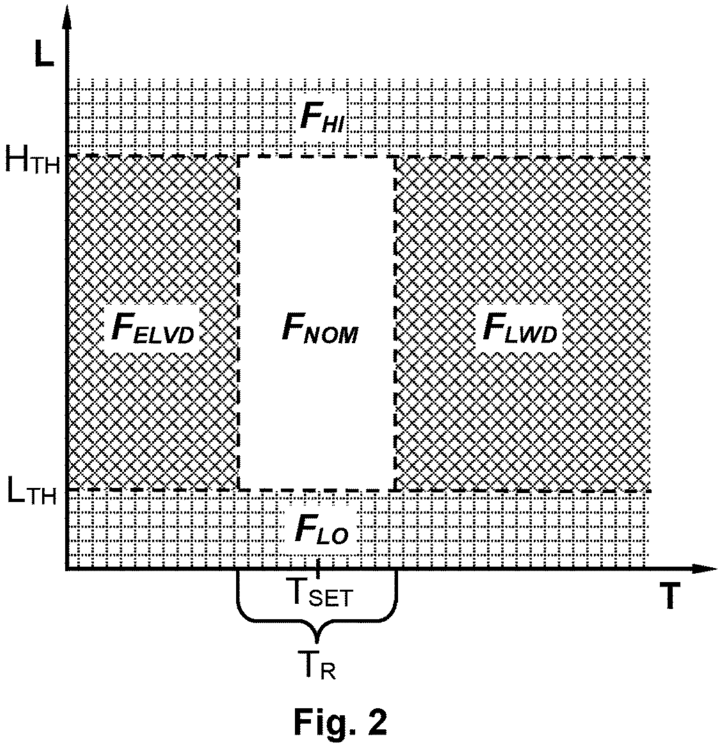
FIG. 2 shows a diagram exemplifying a relationship between a set milk flow rate, a temperature of the milk and a level of milk in a balance tank according to one embodiment of the invention.

FIG. 2 shows a diagram representing a temperature T of the flow of milk F before entering to the storage tank 130 along the horizontal axis, and a milk level L in the balance tank 120 along the vertical axis.

According to one embodiment of the invention, the control unit 110 is configured to generate the first control signal C1 such that the milk pump 150 causes the flow of milk F to be pumped out from the balance tank 120 at a predetermined high speed $F_{HI}$, say at 80% or more of the milk pump's 150 maximum speed, if the level-indicating signal $s(L_{TH}:H_{TH})$ reflects that the milk level L in the balance tank 120 is above or equal to the high-threshold level $H_{TH}$. Namely, if the milk level L is above or equal to the high-threshold level $H_{TH}$, there is an imminent risk that the balance tank 120 will be flooded. In such a situation it is important that the milk level L is reduced quickly. Therefore, the predetermined high speed $F_{HI}$ preferably represents a highest possible pump speed for the milk pump 150 thus accomplishing a quickest possible reduction of the milk level L in the balance tank 120.

Additionally, it may be preferable if the control unit 110 is configured to generate the first control signal C1 such that the milk pump 150 causes the flow of milk F to be pumped out from the balance tank 120 at a predetermined low speed Fro, say at 20% or less of the milk pump's 150 maximum speed, if the level-indicating signal $s(L_{TH}:H_{TH})$ reflects that the milk level L in the balance tank 120 is below or equal to the low-threshold level $L_{TH}$. Namely, otherwise, in such a case, the balance tank 120 might be emptied and undesired air bubbles risk being injected into the milk. It is therefore advantageous that the predetermined low speed Fro represents that the milk pump 150 is inactive, i.e. does not cause any flow of milk at all to be pumped out from the balance tank 120.

According to one embodiment of the invention, the control unit 110 is configured to generate a second control signal C2 based on the temperature-indicating signal T such that a cooling capacity of the cooling system 170 is increased if the temperature-indicating signal T reflects a milk temperature above a set temperature $T_{SET}$ of say 3.5 degrees Celsius. This means that the milk pump 150 may be operated at a relatively high, preferably fixed speed, which, in turn, renders it possible to increase a cooling capacity of a chiller 167 and/or a speed of a coolant pump 165 in the cooling system 170 based on the temperature-indicating signal T.

Analogously, according to another one embodiment of the invention, the control unit 110 is preferably configured to generate the second control signal C2 based on the temperature-indicating signal T such that the cooling capacity of the cooling system 170 is decreased if the temperature-indicating signal T reflects a milk temperature below the set temperature $T_{SET}$. Namely, in such a case, energy can be economized by reducing the cooling of the milk.

According to one embodiment of the invention, the control unit 110 is configured to generate the first control signal C1 based on the temperature-indicating signal T so that the milk flow F is caused to be pumped out from the balance tank 120 at a predetermined nominal speed $F_{NOM}$, say around 50% of the milk pump's 150 maximum speed, if the temperature-indicating signal T indicates a milk temperature within a predefined interval $T_R$ from a set temperature $T_{SET}$, say between 3 and 5 degrees Celsius. Thus, a steady milk flow F can be fed efficiently through the cooling system 170 into the storage tank 130.

If the temperature-indicating signal T indicates a milk temperature below the predefined interval $T_R$, the control unit 110 is configured to generate the first control signal C1 based on the temperature-indicating signal T so that the milk flow F is caused to be pumped out from the balance tank 120 at an elevated speed $F_{ELVD}$, i.e. at % or more of the milk pump's 150 maximum speed, above the predetermined nominal speed $F_{NOM}$, thus causing the milk to be less cooled while forwarding more milk per unit time into the storage tank 130. It is additionally possible to hereby use the further second control signal C2 to also decrease the speed of the coolant pump 165. In this way, less heat will be taken from the milk.

If the temperature-indicating signal T indicates a milk temperature above said predefined interval $T_R$, the control unit 110 is instead configured to generate the first control signal C1 based on the temperature-indicating signal T so that the milk flow F is caused to be pumped out from the balance tank 120 at a lowered speed $F_{LWD}$ below the predetermined nominal speed $F_{NOM}$, i.e. at 50% or less of the milk pump's 150 maximum speed, thus cooling the milk more while passing through the cooling system 170 before entering the storage tank 130. It is also possible to hereby use the further second control signal C2 to increase the speed of the coolant pump 165. In this way, more heat will be taken from the milk.

According to one embodiment of the invention, the cooling system 170 contains a heat exchanger 160, for example a plate heat exchanger (PHE), which is configured to transfer heat energy from the flow of milk F to a cooling medium C, e.g. containing glycol being circulated in the chiller 167 by means of the coolant pump 165. The coolant pump 165 is adapted to operate in response to a second control signal C2.

Here, the control unit 110 is further configured to generate the second control signal C2 based on the temperature-indicating signal T so that a flow of the cooling medium C and/or the cooling capacity of the chiller 167 increases, if the temperature-indicating signal T indicates a milk temperature above the predefined interval $T_R$ during a first uninterrupted period, say 60 seconds. Thereby, any excessive milk temperatures may be reduced efficiently.

Further, if the temperature-indicating signal T indicates a milk temperature below the predefined interval $T_R$ during a second uninterrupted period, say 60 seconds, the control unit 110 is configured generate the second control signal C2 based on the temperature-indicating signal T so that the flow of the cooling medium C and/or the cooling capacity of the chiller 167 decreases. Hence, unnecessary cooling of the milk is avoided and energy is conserved.

Figure 3:
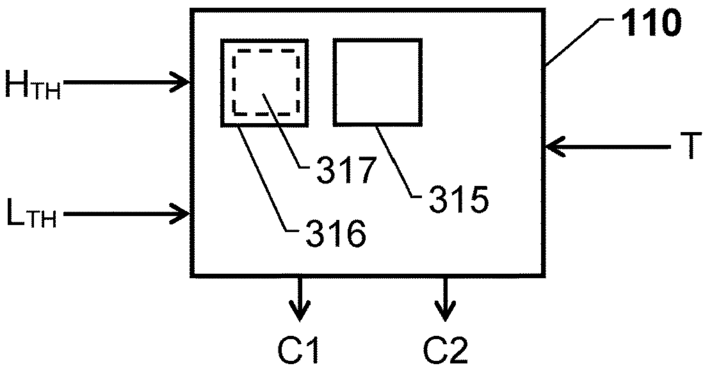
FIG. 3 shows a block diagram of the control unit according to the invention.

FIG. 3 shows a block diagram of the control unit 110 according to the invention. It is generally advantageous if the controller 110 is configured to effect the above-described procedure in an automatic manner by executing a computer program 317. Therefore, the controller 110 may include a memory unit 316, i.e. non-volatile data carrier, storing the computer program 317, which, in turn, contains software for making processing circuitry in the form of at least one processor 315 in the controller 110 execute the actions mentioned in this disclosure when the computer program 317 is run on the at least one processor 315.

Figure 4:
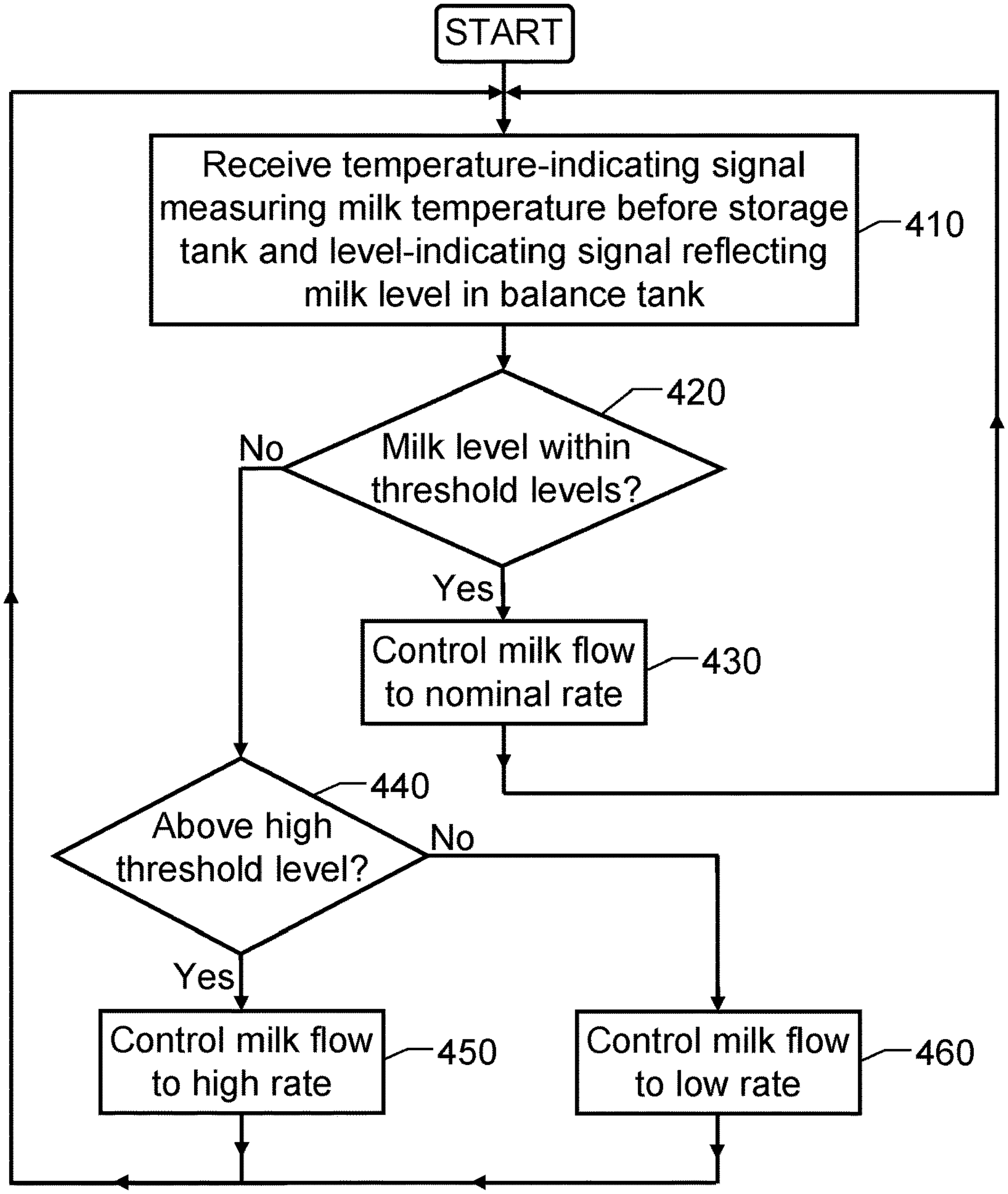
FIG. 4 illustrates, by means of a flow diagram, the general method according to a preferred embodiment of the invention.

In order to sum up, and with reference to the flow diagram in FIG. 4, we will now describe the computer-implemented method according to one embodiment of the invention for controlling the flow of milk F through the cooling system 170 between the balance tank 120 and the storage tank 130, where the balance tank 120 receives an input $M_{IN}$ in the form of milk extracted from a number of milking animals.

In a first step 410, a temperature-indicating signal T is received from a temperature sensor 140 measuring a temperature of the flow of milk F before entering the storage tank 130. A level-indicating signal $s(L_{TH}:H_{TH})$ is also received in step 410, which level-indicating signal $s(L_{TH}:H_{TH})$ reflects a milk level in the balance tank 120 in relation to low- and high-threshold levels respectively.

A subsequent step 420 checks if the level-indicating signal $s(L_{TH}:H_{TH})$ reflects that the milk level in the balance tank 120 is within the low- and high-threshold levels; and if so, a step 430 follows. Otherwise, the procedure continues to a step 440.

In step 430, the milk flow is controlled to a nominal rate by generating the first control signal C1 to the milk pump 150 in the cooling system 170. Thereafter, the procedure loops back to step 410.

In step 440, it is checked if the level-indicating signal $s(L_{TH}:H_{TH})$ reflects that the milk level in the balance tank 120 is above the high-threshold level; and if so, a step 450 follows. Otherwise, the procedure continues to a step 460.

In step 450, the milk flow is controlled to a high rate via the first control signal C1 to the milk pump 150. Thereafter, the procedure loops back to step 410.

In step 460, the milk flow is instead controlled to a low rate via the first control signal C1 to the milk pump 150. Thereafter, the procedure loops back to step 410.

All of the process steps, as well as any sub-sequence of steps, described with reference to FIG. 4 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A control unit (110) for controlling a flow of milk (F) through a cooling system (170), from a balance tank (120) that receives an input ($M_{IN}$) Of milk extracted from milking animals to a storage tank (130) that stores the milk, the control unit (110) being configured to:

receive a temperature-indicating signal (T) from a temperature sensor (140) measuring a temperature of the flow of milk (F) between the cooling system (170) and the storage tank (130);

receive a level-indicating signal (s ($L_{TH}$: $H_{TH}$)) from at least one sensor configured to register a milk level (L) in the balance tank (120) in relation to low- and high-threshold levels respectively;

generate a first control signal (C1) to a milk pump (150) of the cooling system (170) arranged to cause the flow of milk (F) to be pumped out from the balance tank (120), said first control signal (C1) generated based on the temperature-indicating signal (T), wherein the control unit (110) controls a speed of the milk pump (150) via the first control signal (C1) based exclusively on the temperature-indicating signal (T) when the level-indicating signal (s ($L_{TH}$: $H_{TH}$)) received at the control unit (110) reflects that the milk level (L) in the balance tank (120) is between the low-threshold level ($L_{TH}$) and the high-threshold level ($H_{TH}$), and the control unit further configured to control the milk pump (150), via the first control signal (C1), to cause the flow of milk (F) to be pumped out from the balance tank (120) at a predetermined high speed ($F_{HI}$) when the level-indicating signal (s($L_{TH}$: $H_{TH}$)) received at the control unit (110) reflects that the milk level (L) in the balance tank (120) is above or equal to the high-threshold level ($H_{TH}$).

2. The control unit (110) according to claim 1, wherein the predetermined high speed ($F_{HI}$) represents a highest possible pump speed for the milk pump (150).

3. The control unit (110) according to claim 1, further configured to generate a second control signal (C2) to the cooling system (170) based on the temperature-indicating signal (T), and to control a cooling capacity of the cooling system (170) via the second control signal (C2) to increase when the temperature-indicating signal (T) received at the control unit (110) reflects a milk temperature above a set temperature ($T_{SET}$).

4. The control unit (110) according to claim 3, further configured to control the cooling capacity of the cooling system (170) via the second control signal (C2) to decrease when the temperature-indicating signal (T) received at the control unit (110) reflects a milk temperature below the set temperature ($T_{SET}$).

5. The control unit (110) according to claim 1, further configured to control the milk pump (150) to cause the flow of milk (F) to be pumped out from the balance tank (120) at a predetermined low speed ($F_{LO}$) when the level-indicating signal (s ($L_{TH}$: $H_{TH}$)) received at the control unit (110) reflects that the milk level (L) in the balance tank (120) is below or equal to the low-threshold level ($L_{TH}$).

6. The control unit (110) according to claim 1, further configured to control the milk pump (150) to become inactive when the level-indicating signal (s($L_{TH}$: $H_{TH}$)) received at the control unit (110) reflects that the milk level (L) in the balance tank (120) is below or equal to the low-threshold level ($L_{TH}$).

7. The control unit (110) according to claim 1, wherein the control unit (110) controls the milk pump (150), via the first control signal (C1), to cause the milk flow (F) to be pumped out from the balance tank (120) at:

a predetermined nominal speed ($F_{NOM}$) when the temperature-indicating signal (T) received at the control unit (110) indicates a milk temperature within a predefined interval ($T_R$) from a set temperature ($T_{SET}$), an elevated speed ($F_{ELVD}$) above the predetermined nominal speed ($F_{NOM}$) when the temperature-indicating signal (T) received at the control unit (110) indicates a milk temperature below said predefined interval ($T_R$), and a lowered speed ($F_{LWD}$) below the predetermined nominal speed ($F_{NOM}$) when the temperature-indicating signal (T) received at the control unit (110) indicates a milk temperature above said predefined interval ($T_R$).

8. The control unit (110) according to claim 1, wherein the cooling system (170) comprises a heat exchanger (160) configured to transfer heat energy from the flow of milk (F) to a cooling medium (C) that circulates in a chiller (167) by means of a coolant pump (165) that operates in response to a second control signal (C2), and wherein the control unit (110) is further configured to control the coolant pump (165), via the second control signal (C2), based on the temperature-indicating signal (T) so that:

a flow of the cooling medium (C) and/or the cooling capacity of the chiller (167) increases when the temperature-indicating signal (T) received at the control unit (110) indicates a milk temperature above a predefined interval ($T_R$) from a set temperature ($T_{SET}$) during a first uninterrupted period, and the flow of the cooling medium (C) and/or the cooling capacity of the chiller (167) decreases when the temperature-indicating signal (T) received at the control unit (110) indicates a milk temperature below said predefined interval ($T_R$) from the set temperature ($T_{SET}$) during a second uninterrupted period.

9. A computer-implemented method for controlling a flow of milk (F) through a cooling system (170), from a balance tank (120) that receives an input ($M_{IN}$) of milk extracted from milking animals to a storage tank (130) that stores the milk, the method comprising:

receiving a temperature-indicating signal (T) from a temperature sensor (140) measuring a temperature of the flow of milk (F) between the cooling system (170) and the storage tank (130);

receiving a level-indicating signal (s ($L_{TH}$: $H_{TH}$)) from at least one sensor configured to register a milk level (L)

in the balance tank (120) in relation to low- and high-threshold levels respectively;

generating a first control signal (C1) to a milk pump (150) of the cooling system (170), the milk pump (150) arranged to cause the flow of milk (F) to be pumped out from the balance tank (120), said first control signal (C1) generated based on the temperature-indicating signal (T);

determining that the received level-indicating signal (s($L_{TH}$: $H_{TH}$)) reflects that the milk level (L) in the balance tank (120) is between the low-threshold level ($L_{TH}$) and the high-threshold level ($H_{TH}$); and subsequent to said determining, controlling a speed of the milk pump (150) via the first control signal (C1) based exclusively on the temperature-indicating signal (T), and determining that the received level-indicating signal (s($L_{TH}$: $H_{TH}$)) reflects that the milk level (L) in the balance tank (120) is above or equal to the high-threshold level ($H_{TH}$), and subsequently controlling the milk pump (150), via the first control signal (C1), to cause the flow of milk (F) to be pumped out from the balance tank (120) at a predetermined high speed ($F_{HI}$).

10. The method according to claim 9, wherein the predetermined high speed ($F_{HI}$) represents a highest possible pump speed for the milk pump (150).

11. The method according to claim 9, further comprising:

determining that the temperature-indicating signal (T) reflects a milk temperature above a set temperature ($T_{SET}$), and subsequently controlling a cooling capacity of the cooling system (170), via a second control signal (C2) based on the temperature-indicating signal (T), such that the cooling capacity of the cooling system (170) is increased.

12. The method according to claim 11, further comprising:

determining that the temperature-indicating signal (T) reflects a milk temperature below the set temperature ($T_{SET}$), and subsequently controlling the cooling capacity of the cooling system (170), via the second control signal (C2), such that the cooling capacity of the cooling system (170) is decreased.

13. The method according to claim 9, comprising:

determining that the received level-indicating signal (s($L_{TH}$: $H_{TH}$)) reflects that the milk level (L) in the balance tank (120) is below or equal to the low-threshold level ($L_{TH}$), and subsequently controlling the milk pump (150), via the first control signal (C1), to cause the flow of milk (F) to be pumped out from the balance tank (120) at a predetermined low speed ($F_{LO}$).

14. The method according to claim 9, determining that the received level-indicating signal (s ($L_{TH}$: $H_{TH}$)) reflects that the milk level (L) in the balance tank (120) is below or equal to the low-threshold level ($L_{TH}$), and subsequently controlling the milk pump (150) to become inactive.

15. The method according to claim 9, wherein the first control signal (C1) is generated such that the milk flow (F) is caused to be pumped out from the balance tank (120) at:

a predetermined nominal speed ($F_{NOM}$) when the temperature-indicating signal (T) indicates a milk temperature within a predefined interval ($T_R$) from a set temperature ($T_{SET}$), an elevated speed ($F_{ELVD}$) above the predetermined nominal speed ($F_{NOM}$) when the temperature-indicating signal (T) indicates a milk temperature below said predefined interval ($T_R$), and a lowered speed ($F_{LWD}$) below the predetermined nominal speed ($F_{NOM}$) when the temperature-indicating signal (T) indicates a milk temperature above said predefined interval ($T_R$).

16. The method according to claim 9, wherein the cooling system (170) a heat exchanger (160) configured to transfer heat energy from the flow of milk (F) to a cooling medium (C) that circulates in a chiller (167) by means of a coolant pump (165) that operates in response to a second control signal (C2), and the method further comprises:

generating the second control signal (C2) based on the temperature-indicating signal (T) so that:

a flow of the cooling medium (C) and/or the cooling capacity of the chiller (167) increases when the temperature-indicating signal (T) indicates a milk temperature above a predefined interval ($T_R$) from a set temperature ($T_{SET}$) during a first uninterrupted period, and the flow of the cooling medium (C) and/or the cooling capacity of the chiller (167) decreases when the temperature-indicating signal (T) indicates a milk temperature below said predefined interval ($T_R$) from the set temperature ($T_{SET}$) during a second uninterrupted period.

17. A computer-readable non-transitory storage medium having stored thereon a computer program (317) readable by a processing unit (315), the computer program (317) comprising instruction code that when executed by the processing unit causes the processing unit to carry out the method according to claim 9.

* * * * *